US011119293B2

(12) United States Patent
Komiyama et al.

(10) Patent No.: US 11,119,293 B2
(45) Date of Patent: Sep. 14, 2021

(54) IMAGING LENS SYSTEM

(71) Applicant: NIDEC SANKYO CORPORATION, Nagano (JP)

(72) Inventors: Tadashi Komiyama, Nagano (JP); Yosuke Kanzaki, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 222 days.

(21) Appl. No.: 16/481,121

(22) PCT Filed: Jan. 19, 2018

(86) PCT No.: PCT/JP2018/001486
§ 371 (c)(1),
(2) Date: Jul. 26, 2019

(87) PCT Pub. No.: WO2018/142960
PCT Pub. Date: Aug. 9, 2018

(65) Prior Publication Data
US 2019/0339488 A1   Nov. 7, 2019

(30) Foreign Application Priority Data
Jan. 31, 2017   (JP) .............................. JP2017-015051

(51) Int. Cl.
*G02B 9/64* (2006.01)
*G02B 13/00* (2006.01)
*G02B 13/18* (2006.01)

(52) U.S. Cl.
CPC ............. *G02B 9/64* (2013.01); *G02B 13/005* (2013.01); *G02B 13/18* (2013.01)

(58) Field of Classification Search
None
See application file for complete search history.

(56) References Cited

U.S. PATENT DOCUMENTS 5,861,999 A  *  1/1999  Tada ..................... G02B 13/06
                                                      359/752
2013/0215523 A1*  8/2013  Katakura ............. A61B 1/0019
                                                      359/754

FOREIGN PATENT DOCUMENTS

| JP | S61126515 A | 6/1986 |
| JP | H09304694 A | 11/1997 |
| JP | 2015169707 A | 9/2015 |

(Continued)

OTHER PUBLICATIONS

International Search Report corresponding to Application No. PCT/JP2018/001486; dated Feb. 27, 2018.

*Primary Examiner* — Darryl J Collins
(74) *Attorney, Agent, or Firm* — Cantor Colburn LLP (57) ABSTRACT

An imaging lens system may include a first lens; a second lens; a third lens; a diaphragm; a fourth lens; a fifth lens; a sixth lens; and a seventh lens. The first lens may be a positive meniscus lens. The second lens may be a negative meniscus lens. The third lens may be a meniscus lens comprising. The fourth lens may be a positive lens. The fifth lens may be a positive lens. The sixth lens may be a negative lens comprising a sixth lens concave surface facing the image side. The seventh lens may be a positive lens comprising a seventh lens convex surface facing the object side. The fifth lens may be a glass lens. The second, third, fourth, sixth and seventh lenses may be plastic lenses. The sixth lens concave surface may be joined to the seventh lens convex surface with an adhesive.

8 Claims, 7 Drawing Sheets

(56) References Cited

FOREIGN PATENT DOCUMENTS

| JP | 2015180926 A | 10/2015 |
|----|--------------|---------|
| JP | 2016142767 A | 8/2016  |

\* cited by examiner

IMAGING LENS SYSTEM

CROSS REFERENCE TO RELATED APPLICATIONS

This is the U.S. national stage of application No. PCT/JP2018/001486, filed on Jan. 19, 2018. Priority under 35 U.S.C. § 119(a) and 35 U.S.C. § 365(b) is claimed from Japanese Application No. 2017-015051, filed Jan. 31, 2017; the disclosures of which are incorporated herein by reference.

TECHNICAL FIELD

At least an embodiment of the present invention relates to an imaging lens system which is mounted on a vehicle or the like.

BACKGROUND

A lens used in a so-called sensing application for confirming a font side and the like of a vehicle is required with a high resolution and a brighter image in order to perform discrimination and recognition of an obstacle ahead, oncoming vehicles, traffic lanes and the like, and a stable temperature characteristic is also required. Therefore, a configuration has been proposed in which a first lens, a second lens, a third lens, a diaphragm, a fourth lens, a fifth lens, a sixth lens and a seventh lens are disposed in order from an object side, and the fourth lens and the fifth lens configure a cemented lens (see Patent Literatures 1, 2 and 3). Further, in Patent Literatures 1, 2 and 3, all lenses are proposed to be glass lenses.

CITATION LIST

[Patent Literature 1] Japanese Patent Laid-Open No. 2015-169707
[Patent Literature 2] Japanese Patent Laid-Open No. 2015-180926
[Patent Literature 3] Japanese Patent Laid-Open No. 2016-142767

In a case of a glass lens, a lens face is required to be polished and thus, no flange part is provided on an outer side in a radial direction of the lens face. Therefore, it is difficult to perform positioning of the lens by using a flange part. Further, in a case of a glass lens, since a lens face is required to be polished, although the surface accuracy of the lens face is high, an error of about several tens of μm may occur in the thickness of the lens. Therefore, in a case that a fourth lens adjacent to a diaphragm on an image side is a glass lens like a lens configuration described in Patent Literatures 1, 2 and 3, degradation of the sensitivity and the like are easily occurred due to an effect of positioning accuracy of the fourth lens having high sensitivity and due to an effect of thickness accuracy of the lens, and a stable optical characteristic is hard to be obtained.

SUMMARY

In view of the problems described above, at least an embodiment of the present invention provides an imaging lens system capable of obtaining a stable optical characteristic by appropriately disposing a glass lens and a plastic lens.

To solve the above-mentioned problem, at least an embodiment of the present invention provides an imaging lens system configured of a first lens, a second lens, a third lens, a diaphragm, a fourth lens, a fifth lens, a sixth lens and a seventh lens, which are disposed in order from an object side. The first lens is a positive meniscus lens whose convex surface faces the object side, the second lens is a negative meniscus lens whose concave surface faces an image side, the third lens is a meniscus lens whose concave surface faces the object side, the fourth lens is a positive lens whose convex surface faces the image side, the fifth lens is a positive lens, the sixth lens is a negative lens whose concave surface faces the image side, and the seventh lens is a positive lens whose convex surface faces the object side. The fifth lens is a glass lens, and the second lens, the third lens, the fourth lens, the sixth lens and the seventh lens are plastic lenses, and the sixth lens and the seventh lens configure a cemented lens which is configured by joining a face on the image side of the sixth lens to a face on the object side of the seventh lens with an adhesive.

In at least an embodiment of the present invention, a plastic lens is formed by molding and thus, a flange part is provided on an outer side in a radial direction of a lens face. Therefore, the plastic lens can be positioned in a lens holder by the flange part with a high degree of accuracy. Further, since a plastic lens is formed by molding, an error of thickness of the lens is small. Therefore, in a case that the fourth lens adjacent to the diaphragm on the image side is made of a plastic like at least an embodiment of the present invention, degradation of sensitivity and the like due to influence of positioning accuracy of the fourth lens having high sensitivity and influence of thickness accuracy of the lens is hard to occur. Further, even in this case, the fifth lens is a glass lens and thus, the temperature characteristic is stable. Therefore, according to at least an embodiment of the present invention, the glass lens and the plastic are disposed appropriately and thus, a stable optical characteristic can be obtained. Further, the sixth lens and the seventh lens configure a cemented lens and thus, the chromatic aberration and the like can be reduced.

In at least an embodiment of the present invention, an "F"-number of the entire lens system satisfies the following conditional expression:

$$F \leq 1.9.$$

According to this configuration, a bright image can be obtained.

In at least an embodiment of the present invention, when a focal length of the entire lens system is defined as "f0" and an object-image distance from a face on the object side of the first lens to an image pickup element is defined as "D", the object-image distance "D" satisfies the following conditional expression:

$$3 < D/f0 < 4.5.$$

In a case that "the object-image distance "D"/the entire focal length "f0"" is not more than 3 (lower limit), the power of the lens is required to increase and thus, corrections of the spherical aberration and the distortion aberration are difficult. On the other hand, in a case that "the object-image distance "D"/the entire focal length "f0"" is not less than 4.5 (upper limit), the lens diameter and the entire length become large and thus, the size of the imaging lens system is increased.

In at least an embodiment of the present invention, when a refractive index of the sixth lens is defined as "n6" and an Abbe number of the sixth lens is defined as "v6", the refractive index "n6" and the Abbe number "v6" satisfy the following conditional expression:

n6≥1.6, and v6≤26.

According to this configuration, the chromatic aberration of magnification can be reduced and the object-image distance can be shortened.

In at least an embodiment of the present invention, when a focal length of the fifth lens is defined as "f5" and an effective focal length of the entire lens system is defined as "f0", the focal length "f5" and the effective focal length "f0" satisfy the following conditional expression:

1<f5/f0<2.

In a case that "the focal length "f5""/"the effective focal length "f0"" is not more than 1 (lower limit), although the lens diameter and the object-image distance can be shortened, it is difficult to reduce the curvature of field, the chromatic aberration of magnification, the comatic aberration and the like. On the other hand, in a case that "the focal length "f5""/"the effective focal length "f0"" is not less than 2 (upper limit), the lens diameter and the object-image distance become large and, on the other hand, when the lens diameter and the object-image distance are reduced, it is difficult to reduce the astigmatism, the chromatic aberration of magnification, the comatic aberration and the like.

Effects of the Invention

In at least an embodiment of the present invention, a plastic lens is formed by molding and thus, a flange part is provided on an outer side in a radial direction of a lens face. Therefore, the plastic lens can be positioned in a lens holder by the flange part with a high degree of accuracy. Further, since a plastic lens is formed by molding, an error of thickness of the lens is small. Therefore, in a case that the fourth lens adjacent to the diaphragm on the image side is made of a plastic like at least an embodiment of the present invention, degradation of sensitivity and the like due to influence of positioning accuracy of the fourth lens having high sensitivity and influence of thickness accuracy of the lens is hard to occur. Further, even in this case, the fifth lens is a glass lens and thus, the temperature characteristic is stable. Therefore, according to at least an embodiment of the present invention, the glass lens and the plastic are disposed appropriately and thus, a stable optical characteristic can be obtained. Further, the sixth lens and the seventh lens configure a cemented lens and thus, the chromatic aberration and the like can be reduced.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

An embodiment of an imaging lens system to which the present invention is applied will be described below with reference to the accompanying drawings. In the following descriptions, an object side in a direction where an optical axis "L" is extended is indicated with "La" and its image side is indicated with "Lb".

(Entire Configuration)

Figure 1:
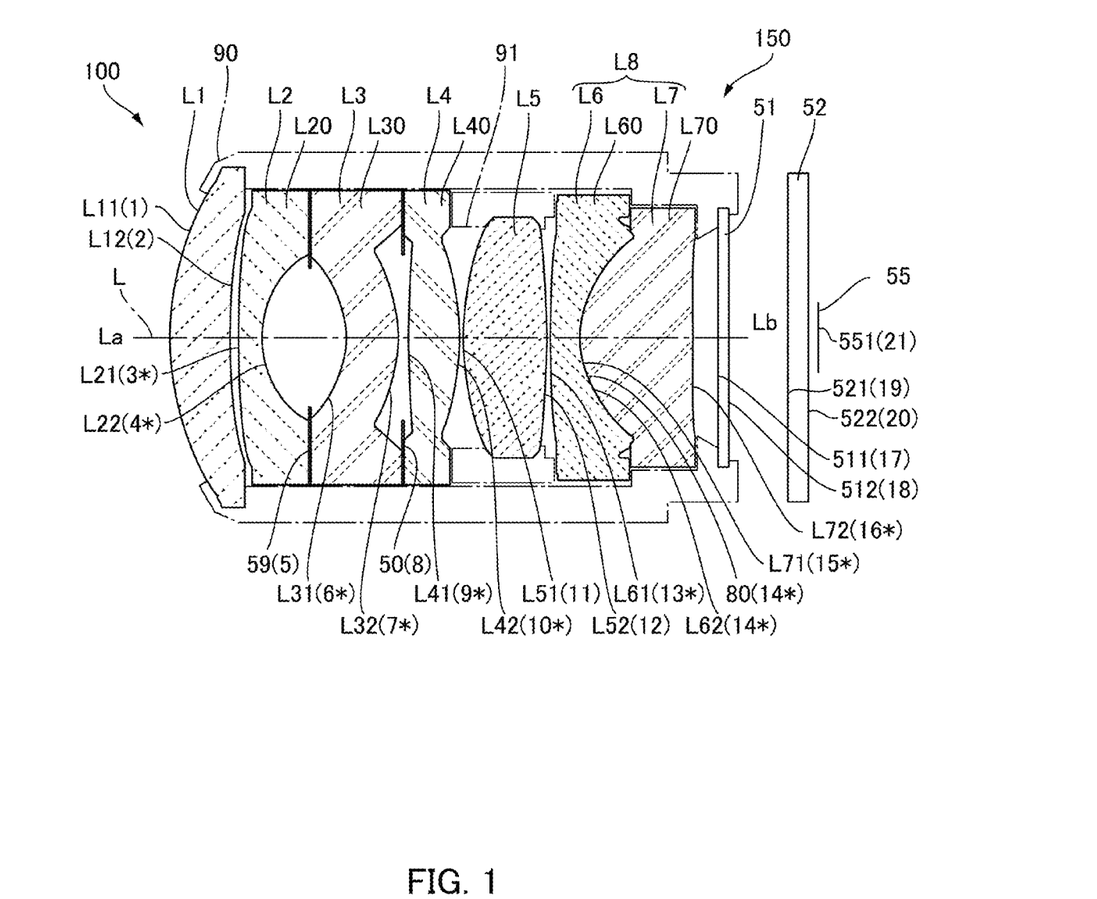
FIG. 1 is an explanatory view showing a configuration of an imaging lens system to which at least an embodiment of the present invention is applied.

FIG. 1 is an explanatory view showing a configuration of an imaging lens system 100 to which at least an embodiment of the present invention is applied. Table 1 shows lens data of the imaging lens system 100 to which at least an embodiment of the present invention is applied. Table 2 shows aspherical coefficients A4, A6, A8, A10, . . . when a shape of an aspheric surface of an aspherical lens used in the imaging lens system 100 is expressed by the following expression (Equation 1). In the following expression, a sag amount (axis in an optical axis direction) is defined as "Z", a vertical height (light ray height) with respect to the optical axis is defined as "r", a conic coefficient is defined as "K", and a reciprocal of a center curvature radius is defined as "c".

$$Z = \frac{cr^2}{1+\sqrt{1-(1+K)c^2r^2}} + \sum_{n=2}^{5} A_{2n} r^{2n} \qquad \text{[Equation 1]}$$

Further, in the expression of respective faces 1 through 18 in FIG. 1, an aspheric surface is attached with "*". Further, Table 1 shows a center curvature radius (Radius) of each face, thickness, refractive index "nd", Abbe number "vd", radius, conical coefficient "K" (Conic coefficient), and a linear expansion coefficient (TCE, unit: $10^{-6}$/° C.). The unit of the center curvature radius, the thickness and the radius is "mm". Further, in a case that a lens face is a convex surface which is protruded toward the object side "La" or a concave surface which is recessed toward the object side "La", the center curvature radius is indicated with a positive value and, in a case that a lens face is a convex surface which is protruded toward the image side "Lb" or a concave surface which is recessed toward the image side, the center curvature radius is indicated with a negative value.

TABLE 1

| # | Type | Radius | Thickness | Focal Length f | Refractive Index nd | Abbe Number vd | radius | K (Conic) | TCE × 10^−6 |
|---|---|---|---|---|---|---|---|---|---|
| 1 | L1 | 10.00000 | 2.000 | 25.256 | 1.8348 | 42.721 | 5.500 | 0.00E+00 | 0.00 |
| 2 |  | 17.20000 | 0.275 |  |  |  | 4.500 | 0.00E+00 | 26.00 |
| 3* | L2 | 30.00000 | 0.800 | −7.011 | 1.54392 | 56.19 | 4.500 | 0.00E+00 | 60.00 |
| 4* |  | 3.36400 | 1.650 |  |  |  | 2.750 | 1.70E−01 | 60.00 |
| 5 | Light Shielding Sheet | Infinity | 1.170 |  |  |  | 2.350 | 0.00E+00 | 60.00 |
| 6* | L3 | −3.50500 | 1.720 | −25.197 | 1.5825 | 30.18 | 2.650 | 0.00E+00 | 69.00 |
| 7* |  | −5.42500 | 0.150 |  |  |  | 3.200 | 0.00E+00 | 69.00 |
| 8 | Diaphragm | Infinity | 0.200 |  |  |  | 2.740 | 0.00E+00 | 60.00 |
| 9* | L4 | 2.83E+01 | 1.710 | 12.438 | 1.54392 | 56.19 | 4.000 | 0.00E+00 | 60.00 |
| 10* |  | −8.75000 | 0.100 |  |  |  | 4.000 | 0.00E+00 | 60.00 |
| 11 | L5 | 9.00E+00 | 2.830 | 10.049 | 1.6968 | 55.46 | 4.000 | 0.00E+00 | 60.00 |
| 12 |  | −28.00000 | 0.100 |  |  |  | 4.000 | 0.00E+00 | 50.00 |
| 13* | L6 | 28.00000 | 1.000 | −6.092 | 1.6355 | 23.972 | 4.000 | 0.00000E+00 | 67.00 |
| 14 | Adhesive | 3.38000 | 0.010 |  | 1.4858 | 56.091 | 3.600 | −1.37000E+00 | 60.00 |
| 15* | L7 | 3.38000 | 3.760 | 5.776 | 1.54392 | 56.19 | 3.600 | −1.37E+00 | 60.00 |
| 16* |  | −2.88E+01 | 1.500 |  |  |  | 3.600 | 0.00E+00 | 60.00 |
| 17 | Filter | Infinity | 0.300 |  | 1.5168 | 64.167 | 3.299 | 0.00E+00 | 0.00 |
| 18 |  | Infinity | 2.716 |  |  |  | 3.319 | 0.00E+00 | 26.00 |
| 19 | Cover Glass | Infinity | 0.400 |  | 1.5168 | 64.167 | 3.600 | 0.00E+00 | 0.00 |
| 20 |  | Infinity | 0.150 |  |  |  | 3.629 | 0.00E+00 | 26.00 |
| 21 | Imaging Face | Infinity | 0.000 |  |  |  | 3.539 | 0.00E+00 | 26.00 |

TABLE 2

| # |  | 2nd Order Term A2 | 4th Order Term A4 | 6th Order Term A6 | 8th Order Term A8 | 10th Order Term A10 |
|---|---|---|---|---|---|---|
| 3* | L2 | 0.00000E+00 | 1.87000E−04 | 0.00000E+00 | 0.00000E+00 | 0.00E+00 |
| 4* |  | 0.00000E+00 | −1.35000E−04 | 1.68000E−05 | 0.00000E+00 | 0.00E+00 |
| 6* | L3 | 0.00000E+00 | 1.09000E−03 | 1.29000E−04 | 0.00000E+00 | 0.00E+00 |
| 7* |  | 0.00000E+00 | 2.30000E−04 | 3.42000E−05 | 0.00000E+00 | 0.00E+00 |
| 9* | L4 | 0.00000E+00 | −2.46000E−04 | −4.43000E−06 | 0.00000E+00 | 0.00E+00 |
| 10* |  | 0.00000E+00 | 1.43000E−04 | −3.27000E−05 | 0.00000E+00 | 0.00E+00 |
| 13* | L6 | 0.00000E+00 | 2.21000E−04 | −2.05000E−05 | 0.00000E+00 | 0.00E+00 |
| 15* | L7 | 0.00000E+00 | 9.95000E−04 | 1.69000E−04 | 0.00000E+00 | 0.00E+00 |
| 16* |  | 0.00E+00 | 2.26E−03 | 7.00E−06 | 7.00E−07 | 0.00E+00 |

As shown in FIG. 1, the lens unit 150 (imaging unit) in this embodiment includes the imaging lens system 100 and a lens holder 90 which holds the imaging lens system 100 on an inner side. In this embodiment, a horizontal viewing angle of the imaging lens system 100 is about 52°.

The imaging lens system 100 consists of a first lens "L1", a second lens "L2", a third lens "L3", a diaphragm 50, a fourth lens "L4", a fifth lens "L5", a sixth lens "L6" and a seventh lens "L7", which are disposed from the object side "La" toward the image side "Lb" in this order. An infrared filter 51 in a flat plate shape, a light transmissive cover glass 52 and an image pickup element 55 are disposed in order on the image side "Lb" with respect to the seventh lens "L7". Further, a light shielding sheet 59 in a circular ring shape is disposed between the second lens "L2" and the third lens "L3".

In the imaging lens system 100, a focal length "f0" of the entire lens system (effective focal length) is 5.86 mm, an "F"-number is 1.6 and an object-image distance (Total Track) is 22.541 mm. Further, a vertical viewing angle of the imaging lens system 100 is 44.2° and its horizontal viewing angle is 52.4°.

In this embodiment, the fifth face 5 is configured by the light shielding sheet 59 and the eighth face 8 is configured by the diaphragm 50. The seventeenth face 17 is configured by a face 511 on the object side "La" of the infrared filter 51, and the eighteenth face 18 is configured by a face 512 on the image side "Lb" of the infrared filter 51. The nineteenth face 19 is configured by a face 521 on the object side "La" of the cover glass 52, and the twentieth face 20 is configured by a face 522 on the image side "Lb" of the cover glass 52. The twenty-first face 21 is configured by an imaging face 551 of the image pickup element 55.

(Lens Configuration)

The first lens "L1" is a positive meniscus lens (meniscus lens having positive power) whose convex surface "L11" (first face 1) faces the object side "La", and its concave surface "L12" (second face 2) faces the image side "Lb". In the first lens "L1", the convex surface "L11" (first face 1) on the object side "La" and the concave surface "L12" (second face 2) on the image side "Lb" are spherical.

The second lens "L2" is a negative meniscus lens (meniscus lens having negative power) whose concave surface "L22" (fourth face 4) faces the image side "Lb" and its convex surface "L21" (third face 3) faces the object side "La". In the second lens "L2", the convex surface "L21" (third face 3) on the object side "La" and the concave surface "L22" (fourth face 4) on the image side "Lb" are aspherical.

The third lens "L3" is a meniscus lens whose concave surface "L31" (sixth face 6) faces the object side "La" and its convex surface "L32" (seventh face 7) faces the image side "Lb". The third lens "L3" may have either positive power or negative power but, in this embodiment, the third lens "L3" has negative power. In the third lens "L3", the concave surface "L31" (sixth face 6) on the object side "La" and the convex surface "L32" (seventh face 7) on the image side "Lb" are aspherical.

The fourth lens "L4" is a positive lens (lens having positive power) whose convex surface L42 (tenth face 10) faces the image side "Lb". In the fourth lens "L4", the face on the object side "La" may be either a convex surface or a concave surface but, in this embodiment, the face on the object side "La" of the fourth lens "L4" is a convex surface "L41" (ninth face 9). In the fourth lens "L4", the convex surface "L41" (ninth face 9) on the object side "La" and the convex surface "L42" (tenth face 10) on the image side "Lb" are aspherical.

The fifth lens "L5" is a positive lens (lens having positive power). In this embodiment, the convex surface "L51" (eleventh face 11) of the fifth lens "L5" faces the object side "La" and the convex surface "L52" (twelfth face 12) faces the image side "Lb". In the fifth lens "L5", the convex surface "L51" (eleventh face 11) on the object side "La" and the convex surface "L52" (twelfth face 12) on the image side "Lb" are spherical.

The sixth lens "L6" is a negative lens (lens having negative power) whose concave surface L62 (fourteenth face 14) faces the image side "Lb". The face on the object side "La" of the sixth lens "L6" may be either a convex surface or a concave surface but, in this embodiment, the face on the object side "La" of the sixth lens "L6" is the convex surface "L61" (thirteenth face 13). In the sixth lens "L6", the convex surface "L61" (thirteenth face 13) on the object side "La" and the concave surface "L62" (fourteenth face 14) on the image side "Lb" are aspherical.

The seventh lens "L7" is a positive lens (lens having positive power) whose convex surface "L71" (fifteenth face 15) faces the object side "La". In the seventh lens "L7", the face on the image side "Lb" may be either a convex surface or a concave surface but, in this embodiment, the face on the image side "Lb" of the seventh lens "L7" is the convex surface "L72" (sixteenth face 16). In the seventh lens "L7", the convex surface "L71" (fifteenth face 15) on the object side "La" and the convex surface "L72" (sixteenth face 16) on the image side "Lb" are aspherical.

The second lens "L2", the third lens "L3", the fourth lens "L4", the sixth lens "L6" and the seventh lens "L7" are plastic lenses made of acrylic-based, polycarbonate-based, polyolefin-based resin or the like. Therefore, the second lens "L2", the third lens "L3", the fourth lens "L4", the sixth lens "L6" and the seventh lens "L7" are provided with flange parts "L20", "L30", "L40", "L60" and "L70" on an outer side in a radial direction of the respective lens faces. Accordingly, the second lens "L2", the third lens "L3", the fourth lens "L4" and the sixth lens "L6" are positioned by making the flange parts "L20", "L30", "L40" and "L60" contact with the lens holder 90. As described below, the seventh lens "L7" and the sixth lens "L6" configure a cemented lens "L8" and the flange part "L70" of the seventh lens "L7" does not contact with the lens holder 90. In this case, it may be structured that the flange part "L70" of the seventh lens "L7" is contacted with the lens holder 90.

The fifth lens "L5" is a glass lens and, among various types of lens material, the material is used whose temperature coefficient of the refractive index varies linearly in a range of −40° C. through +120° C. Further, since the fifth lens "L5" is a glass lens, a flange part is not provided on an outer side in the radial direction of the lens face. Therefore, an end part on an outer peripheral side of the fifth lens "L5" is held by a tube-shaped member 91, and the fifth lens "L5" is held by the lens holder 90 through the tube-shaped member 91.

The first lens "L1" may be either a glass lens or a plastic lens. In this embodiment, the first lens "L1" is a glass lens. Therefore, even in a case that the convex surface (first face 1) of the first lens "L1" which is located on the outermost position on the object side is exposed, the first lens "L1" is not easily scratched. Since the first lens "L1" is a glass lens, the first lens "L1" is not provided with a flange part.

In this embodiment, the sixth lens "L6" and the seventh lens "L7" configure the cemented lens L8 in which the concave surface "L62" on the image side "Lb" of the sixth lens "L6" and the convex surface "L71" on the object side "La" of the seventh lens "L7" are joined to each other by an adhesive 80. Therefore, a shape of the concave surface "L62" on the image side "Lb" of the sixth lens "L6" is the same as that of the convex surface "L71" on the object side "La" of the seventh lens "L7". Further, the fourteenth face 14 is configured by the adhesive 80 and the concave surface "L62" on the image side "Lb" of the sixth lens "L6".

(Detailed Configuration of Lenses)

In the imaging lens system 100 of the seven lenses in six groups configured as described above, the "F"-number of the entire lens system satisfies the following conditional expression 1:

$$F \leq 1.9.$$

In this embodiment, the "F"-number of the entire lens system is 1.6. Therefore, the "F"-number satisfies the conditional expression 1 and a bright image can be obtained.

Further, when the focal length of the entire lens system is defined as "f0", and an object-image distance from the face on the object side of the first lens "L1" (convex surface "L1", first face 1) to the imaging face 551 of the image pickup element 55 (twenty-first face 21) is defined as "D", the object-image distance "D" satisfies the following conditional expression 2:

$$3 < D/f0 < 4.5.$$

In this embodiment, the focal length "f0" of the entire lens system is 5.86 mm, the object-image distance "D" is 22.541 mm, and the "D/f0" is 3.847. Therefore, the "D/f0" satisfies the conditional expression 2 and thus, the powers of the lenses, the lens diameters and the entire length are not required to increase. In this embodiment, when the D/f0" is not more than 3 (lower limit), the powers of the lenses are required to increase and thus, corrections of the spherical aberration and the distortion aberration are difficult. On the other hand, in a case that the "D/f0" is not less than 4.5 (upper limit), the lens diameters and the entire length become large and thus, the size of the imaging lens system 100 is increased.

Further, when the refractive index of the sixth lens "L6" is defined as "n6" and the Abbe number of the sixth lens "L6" is defined as "v6", the refractive index "n6" and the Abbe number "v6" satisfy the following conditional expression 3:

$$n6 \geq 1.6$$

$$v6 \leq 26.$$

In this embodiment, the refractive index "n6" is 1.6355, and the Abbe number "v6" is 2.972. Therefore, the refractive index "n6" and the Abbe number "v6" satisfy the conditional expression 3 and thus, the chromatic aberration of magnification can be reduced and the object-image distance "D" can be shortened.

Further, when the focal length of the fifth lens "L5" is defined as "f5" and the effective focal length of the entire lens system is defined as "f0", the focal length "f5" and the effective focal length "f0" satisfy the following conditional expression 4:

$$1 < f5/f0 < 2.$$

In this embodiment, the focal length "f5" of the fifth lens "L5" is 10.049, the effective focal length "f0" is 5.86 and the "f5/f0" is 1.714. Therefore, the focal length "f5" of the fifth lens "L5" and the effective focal length "f0" satisfy the following conditional expression 4. The object-image distance "D" can be shortened and the curvature of field, the chromatic aberration of magnification, comatic aberration and the like can be reduced. In this embodiment, in a case that "the focal length "f5""/"the effective focal length "f0""" is not more than 1 (lower limit), although the lens diameter and the object-image distance "D" can be shortened, it becomes difficult to reduce the curvature of field, the chromatic aberration of magnification, the comatic aberration and the like. On the other hand, in a case that "the focal length "f5""/"the effective focal length "f0""" is not less than 2 (upper limit), the lens diameter and the object-image distance "D" become large.

(MTF Characteristics)

Figure 2:
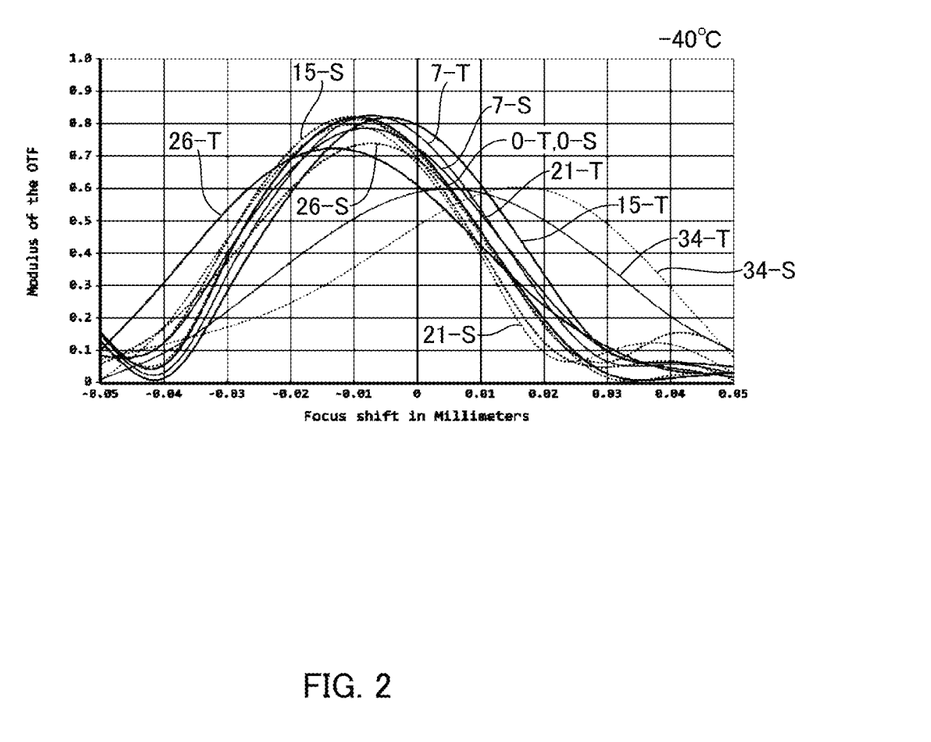
FIG. 2 is a graph showing MTF characteristics at −40° C. of an imaging lens system to which at least an embodiment of the present invention is applied.
Figure 3:
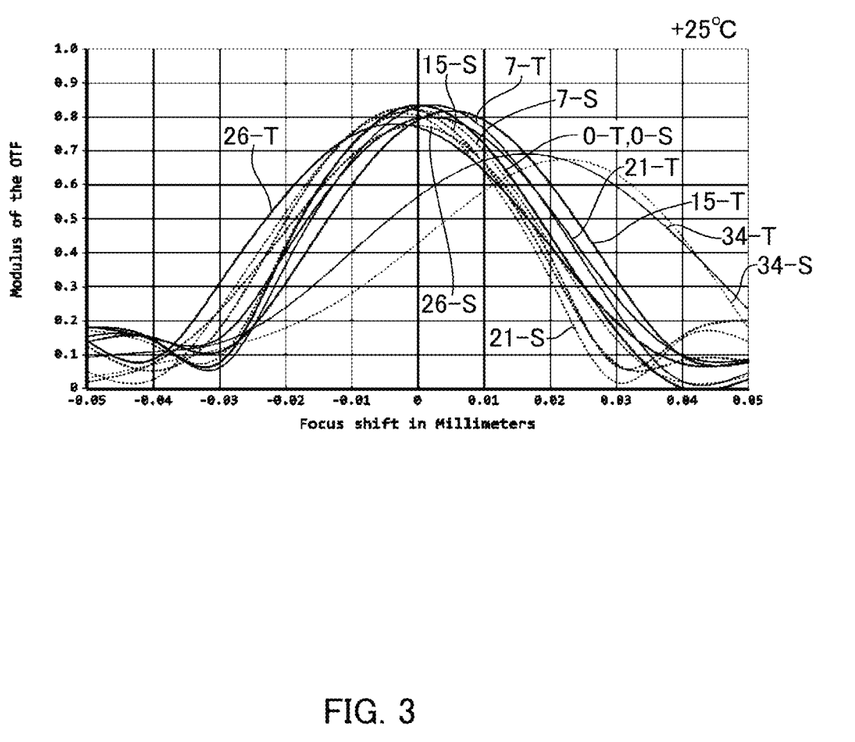
FIG. 3 is a graph showing MTF characteristics at +25° C. of an imaging lens system to which at least an embodiment of the present invention is applied.
Figure 4:
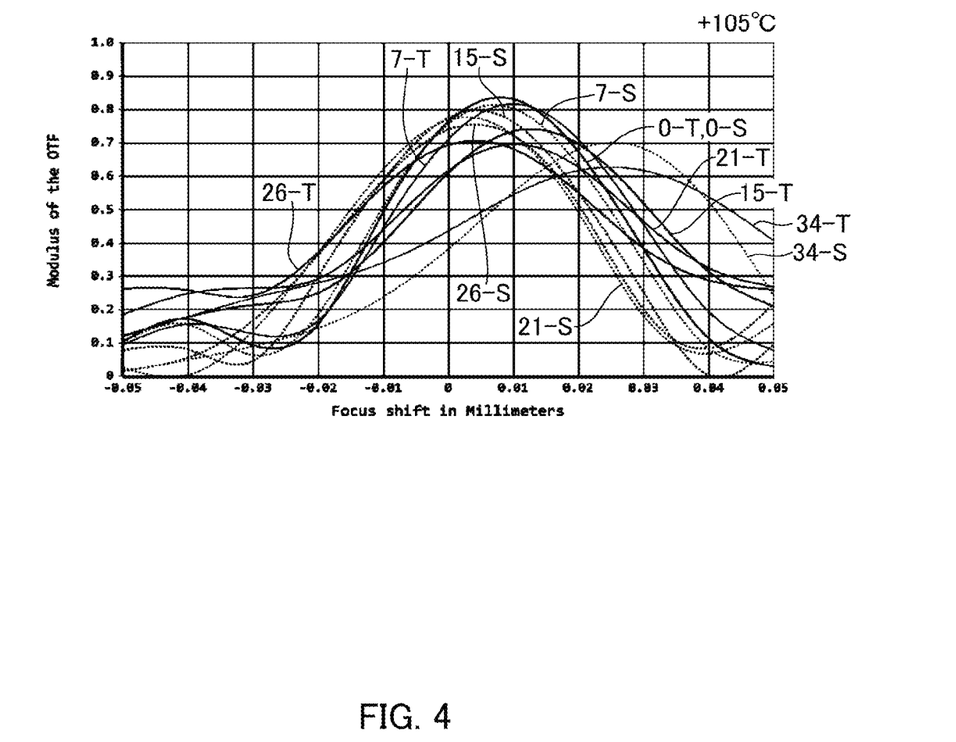
FIG. 4 is a graph showing MTF characteristics at +105° C. of an imaging lens system to which at least an embodiment of the present invention is applied.

FIG. 2 is a graph showing the MTF characteristics at −40° C. of the imaging lens system 100 to which at least an embodiment of the present invention is applied. FIG. 3 is a graph showing the MTF characteristics at +25° C. of the imaging lens system 100 to which at least an embodiment of the present invention is applied. FIG. 4 is a graph showing the MTF characteristics at +105° C. of the imaging lens system 100 to which at least an embodiment of the present invention is applied. In FIG. 2, FIG. 3 and FIG. 4, the MTF characteristics in the frequency of 60 lp/mm are shown. Further, FIG. 2, FIG. 3 and FIG. 4 show the MTF characteristics in the tangential (Tan) direction and the sagittal (Sagi) direction at the view angles of 0°, 7°, 15°, 21°, 26° and 34°. In FIG. 2, FIG. 3 and FIG. 4, "T" indicating tangential and "S" indicating sagittal are added after the numeral indicating its view angle.

As shown in FIG. 2, FIG. 3 and FIG. 4, the imaging lens system 100 in this embodiment has a sufficient resolution and, in addition, the imaging lens system 100 has a sufficient resolution over a wide temperature range.

(Aberration Characteristics of Imaging Lens System 100)

Figure 5:
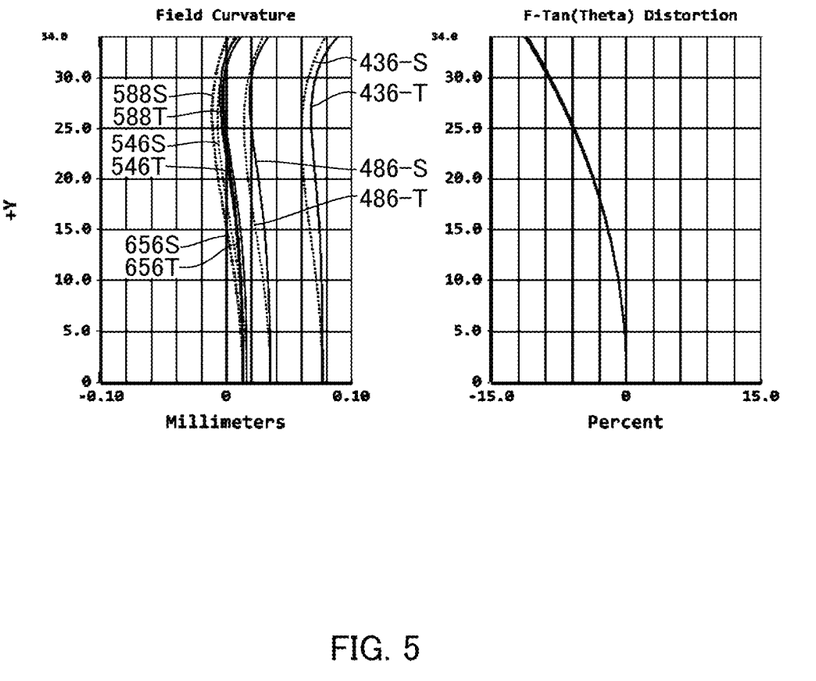
FIG. 5 is an explanatory view showing astigmatism and distortion of an imaging lens system to which at least an embodiment of the present invention is applied.
Figure 6:
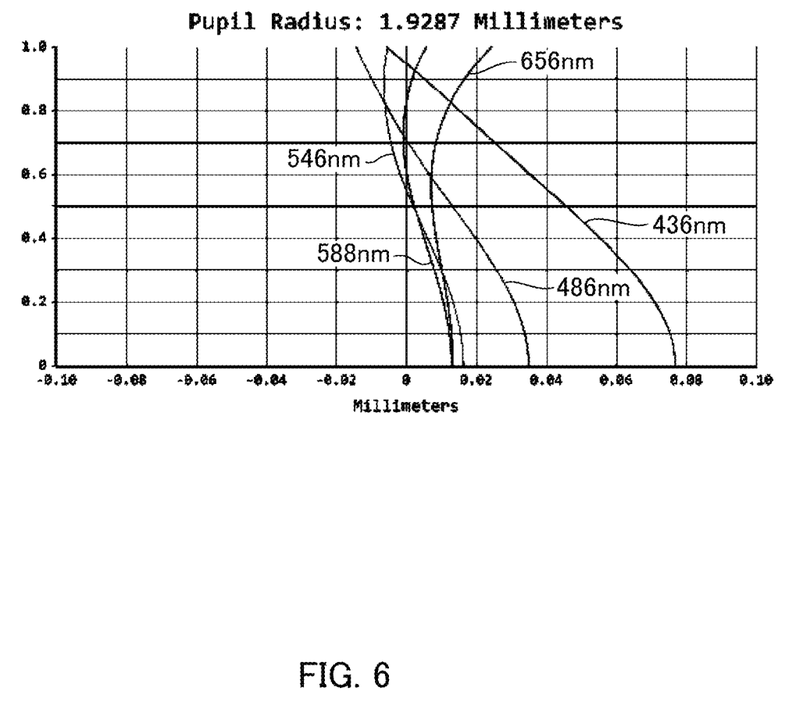
FIG. 6 is an explanatory view showing spherical aberrations of an imaging lens system to which at least an embodiment of the present invention is applied.
Figure 7:
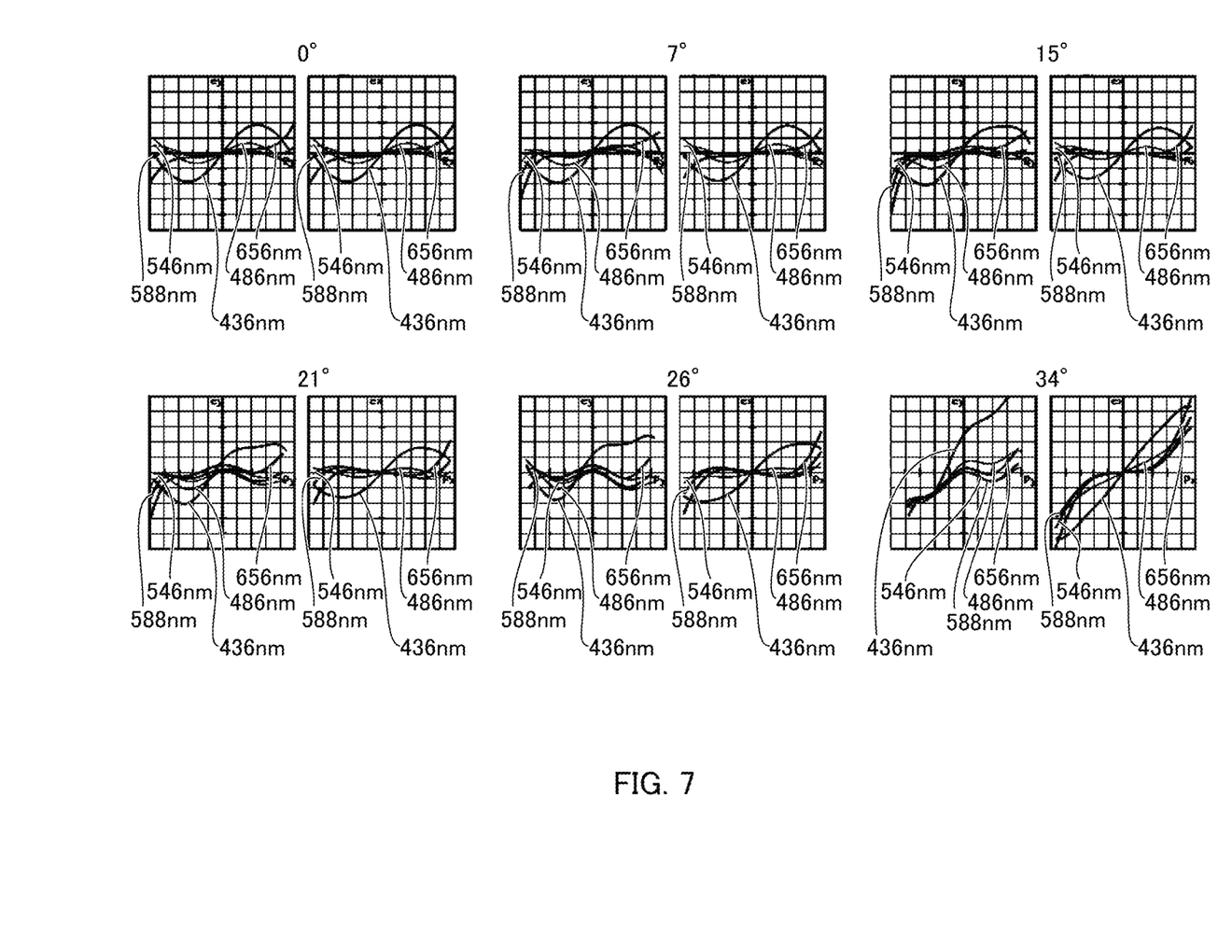
FIG. 7 is an explanatory view showing lateral aberrations of an imaging lens system to which at least an embodiment of the present invention is applied.

FIG. 5 is an explanatory view showing the astigmatism and the distortion of the imaging lens system 100 to which at least an embodiment of the present invention is applied. FIG. 6 is an explanatory view showing the spherical aberrations of the imaging lens system 100 to which at least an embodiment of the present invention is applied. FIG. 7 is an explanatory view showing the lateral aberrations of the imaging lens system 100 to which at least an embodiment of the present invention is applied. FIG. 5, FIG. 6 and FIG. 7 show the respective aberrations in the wavelengths of 656 nm, 546 nm, 588 nm, 486 nm and 436 nm. In FIG. 5, "T" indicating tangential and "S" indicating sagittal are added after the numeral indicating its wavelength. The distortion shown in FIG. 5 indicates the variation ratio of images between an imaging center part and a peripheral part and, as the absolute value of the numerical value indicating the distortion becomes smaller, a high-precision lens is attained. Further, FIG. 7 collectively show the lateral aberrations in two directions ("y" direction and "x" direction) perpendicular to the optical axis at the respective view angles 0°, 7°, 15°, 21°, 26° and 34° in the lights of the wavelengths 656 nm, 546 nm, 588 nm, 486 nm and 436 nm.

As shown in FIG. 5 through FIG. 7, in the imaging lens system 100 in this embodiment, the astigmatism (distortion), the spherical aberration and the lateral aberration are corrected to an appropriate level.

(Principal Effects in this Embodiment)

As described above, the imaging lens system 100 in this embodiment has a lens configuration of seven lenses in six groups, and the fourth lens "L4" adjacent to the diaphragm 50 on the image side "Lb" is a plastic. Further, the third lens "L3" adjacent to the diaphragm 50 on the object side "La" is also a plastic. The plastic lens is formed by molding and thus, the flange parts "L30" and "L40" are provided on an outer side in the radial direction of the lens faces. Therefore, the third lens "L3" and the fourth lens "L4" can be positioned in the lens holder 90 by the flange parts "L30" and "L40" with a high degree of accuracy. Further, since a plastic lens is formed by molding, an error of thickness of the lens is small. Therefore, in a case that the third lens "L3" and the fourth lens "L4" adjacent to the diaphragm 50 are made of a plastic like this embodiment, degradation of sensitivity and the like due to influence of the positioning accuracy of the third lens "L3" and the fourth lens "L4" having high sensitivity and influence of the thickness accuracy of the lenses are hard to occur. Even in this case, the fifth lens "L5" on the image side "Lb" with respect to the diaphragm 50 is a glass lens and thus, the temperature characteristic of the imaging lens system 100 is stable, for example, variation of the view angle caused by a temperature change is small. Therefore, according to this embodiment, the glass lens and the plastic are disposed appropriately and thus, a stable optical characteristic can be obtained.

Further, the sixth lens "L6" and the seventh lens "L7" configure a cemented lens and thus, the chromatic aberration and the like can be reduced. Further, the second lens "L2", the third lens "L3", the fourth lens "L4", the sixth lens "L6" and the seventh lens "L7" are aspherical lenses and thus, the spherical aberrations can be reduced.

Further, the imaging lens system 100 in this embodiment satisfies the above-mentioned conditional expressions 1, 2 and 3 and thus, the powers of the lenses, lens diameters and the entire length are not required to increase excessively.

Other Embodiments

In the embodiment described above, the first lens "L1" is a glass lens. However, at least an embodiment of the present invention may be applied to a case that the first lens "L1" is a plastic lens.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. An imaging lens system for use with an image pickup element, the imaging lens system comprising:
a first lens;
a second lens provided on an image side of the first lens;
a third lens provided on an image side of the second lens;
a diaphragm provided on an image side of the third lens;
a fourth lens provided on an image side of the diaphragm;
a fifth lens provided on an image side of the fourth lens;
a sixth lens provided on an image side of the fifth lens; and
a seventh lens provided on an image side of the sixth lens;
wherein
the first lens is a positive meniscus lens comprising a first lens convex surface facing an object side,
the second lens is a negative meniscus lens comprising a second lens concave surface facing an image side,
the third lens is a meniscus lens comprising a third lens concave surface facing the object side,
the fourth lens is a positive lens comprising a fourth lens convex surface facing the image side,
the fifth lens is a positive lens,
the sixth lens is a negative lens comprising a sixth lens concave surface facing the image side,
the seventh lens is a positive lens comprising a seventh lens convex surface facing the object side,
the fifth lens is a glass lens,
the second lens, the third lens, the fourth lens, the sixth lens and the seventh lens are plastic lenses, and
the sixth lens concave surface is joined to the seventh lens convex surface with an adhesive.

2. The imaging lens system according to claim 1, wherein an "F"-number of the imaging lens system satisfies a following conditional expression:

$F \leq 1.9$.

3. The imaging lens system according to claim 2, wherein when a focal length of an entire lens system is defined as "f0" and an object-image distance from the first lens convex surface to an image pickup element is defined as "D", the object-image distance "D" satisfies a following conditional expression:

$3 < D/f0 < 4.5$.

4. The imaging lens system according to claim 3, wherein when a refractive index of the sixth lens is defined as "n6" and an Abbe number of the sixth lens is defined as "v6", the refractive index "n6" and the Abbe number "v6" satisfy a following conditional expression:

$n6 \geq 1.6$, and $v6 \leq 26$.

5. The imaging lens system according to claim 4, wherein when a focal length of the fifth lens is defined as "f5" and an effective focal length of the imaging lens system is defined as "f0", the focal length "f5" and the effective focal length "f0" satisfy a following conditional expression:

$1 < f5/f0 < 2$.

6. The imaging lens system according to claim 1, wherein when a focal length of the imaging lens system is defined as "f0" and an object-image distance from the first lens convex surface to an image pickup element is defined as "D", the object-image distance "D" satisfies a following conditional expression:

$3 < D/f0 < 4.5$.

7. The imaging lens system according to claim 1, wherein when a refractive index of the sixth lens is defined as "n6" and an Abbe number of the sixth lens is defined as "v6", the refractive index "n6" and the Abbe number "v6" satisfy a following conditional expression:

$n6 \geq 1.6$, and $v6 \leq 26$.

8. The imaging lens system according to claim 1, wherein when a focal length of the fifth lens is defined as "f5" and an effective focal length of the imaging lens system is defined as "f0", the focal length "f5" and the effective focal length "f0" satisfy a following conditional expression:

$1 < f5/f0 < 2$.

* * * * *